United States Patent
Takizawa

(10) Patent No.: US 11,537,034 B2
(45) Date of Patent: Dec. 27, 2022

(54) PROJECTION OPTICAL APPARATUS AND PROJECTOR WITH IMPROVED COOLING CAPABILITY

(71) Applicant: SEIKO EPSON CORPORATION, Tokyo (JP)

(72) Inventor: Takahiro Takizawa, Suzaka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/237,271

(22) Filed: Apr. 22, 2021

(65) Prior Publication Data
US 2021/0333697 A1    Oct. 28, 2021

(30) Foreign Application Priority Data
Apr. 22, 2020    (JP) .............................. JP2020-075885

(51) Int. Cl.
*G03B 21/16*    (2006.01)
*G03B 21/14*    (2006.01)
*G03B 21/28*    (2006.01)

(52) U.S. Cl.
CPC ........... *G03B 21/16* (2013.01); *G03B 21/145* (2013.01); *G03B 21/28* (2013.01)

(58) Field of Classification Search
CPC ....... G03B 21/28; G03B 21/16; G03B 21/145
See application file for complete search history.

(56) References Cited

U.S. PATENT DOCUMENTS

| | | | |
|---|---|---|---|
| 9,411,216 B2 * | 8/2016 | Yamada | .................. G03B 21/16 |
| 10,048,476 B2 | 8/2018 | Amano | |
| 10,168,609 B2 | 1/2019 | Kuroda | |
| 2007/0201235 A1 * | 8/2007 | Sawai | .................. G03B 21/208 362/341 |
| 2008/0186606 A1 * | 8/2008 | Sugano | .................. G03B 21/10 359/871 |
| 2008/0284986 A1 * | 11/2008 | Tachibana | ............... G03B 21/28 353/69 |
| 2013/0010268 A1 * | 1/2013 | Nishima | ................ G03B 21/16 353/52 |
| 2015/0015851 A1 * | 1/2015 | Yamada | ............... G02B 7/1815 353/61 |
| 2016/0246037 A1 | 8/2016 | Amano | |
| 2018/0217477 A1 | 8/2018 | Kurota et al. | |
| 2018/0217489 A1 | 8/2018 | Kuroda | |
| 2020/0404231 A1 * | 12/2020 | Okubo | ................. H04N 9/3102 |

(Continued)

FOREIGN PATENT DOCUMENTS

| CN | 108375866 A | 8/2018 |
|---|---|---|
| JP | 2016-156986 A | 9/2016 |

(Continued)

*Primary Examiner* — Bao-Luan Q Le
(74) *Attorney, Agent, or Firm* — Dority & Manning, P.A.

(57) ABSTRACT

A projection optical apparatus includes a first housing, a second housing accommodated in the first housing, and a projection system accommodated in the second housing. The projection system includes a first reflector deflecting the optical path of the projection system. The first housing has a plurality of first openings that cause the interior of the first housing to communicate with the exterior of the first housing. The second housing has a plurality of second openings that cause the interior of the second housing to communicate with the exterior of the second housing.

13 Claims, 9 Drawing Sheets

(56) References Cited

U.S. PATENT DOCUMENTS

| | | | | |
|---|---|---|---|---|
| 2021/0247587 A1* | 8/2021 | Kayano | ............... | G03B 21/30 |
| 2021/0247672 A1* | 8/2021 | Nagatoshi | ............... | G02B 7/04 |
| 2021/0247673 A1* | 8/2021 | Kamigaki | ............... | H04N 5/74 |
| 2021/0247674 A1* | 8/2021 | Shimizu | ............... | H04N 5/74 |
| 2021/0247682 A1* | 8/2021 | Shimizu | ............... | H04N 9/317 |
| 2021/0247683 A1* | 8/2021 | Kamigaki | ............... | G03B 21/145 |
| 2021/0247684 A1* | 8/2021 | Kamigaki | ............... | G02B 7/04 |
| 2021/0250557 A1* | 8/2021 | Shimizu | ............... | G03B 21/145 |
| 2021/0250558 A1* | 8/2021 | Shimizu | ............... | G02B 7/023 |
| 2021/0250559 A1* | 8/2021 | Shimizu | ............... | H04N 9/3155 |
| 2021/0255528 A1* | 8/2021 | Kamigaki | ............... | G03B 21/28 |
| 2021/0255529 A1* | 8/2021 | Kamigaki | ............... | G03B 21/28 |
| 2021/0373299 A1* | 12/2021 | Kayano | ............... | G03B 21/145 |
| 2021/0389649 A1* | 12/2021 | Kayano | ............... | G03B 21/00 |
| 2022/0050368 A1* | 2/2022 | Amano | ............... | G03B 21/00 |
| 2022/0091491 A1* | 3/2022 | Kayano | ............... | G03B 21/142 |

FOREIGN PATENT DOCUMENTS

| | | |
|---|---|---|
| JP | 2017-044855 A | 3/2017 |
| WO | WO2017/056925 A | 4/2017 |

* cited by examiner

PROJECTION OPTICAL APPARATUS AND PROJECTOR WITH IMPROVED COOLING CAPABILITY

The present application is based on, and claims priority from JP Application Serial Number 2020-075885, filed Apr. 22, 2020, the disclosure of which is hereby incorporated by reference herein in its entirety.

BACKGROUND

1. Technical Field

The present disclosure relates to a projection optical apparatus and a projector.

2. Related Art

There has been a known deflection-type projection optical apparatus used in a projection-type display apparatus, such as a projector. A projection optical apparatus of this type includes a projection lens and a mirror or any other optical part for changing the direction in which a display image to be projected is projected. For example, JP-A-2016-156986 discloses a projection system including a lens group and two mirrors, which form an optical path deflector, as the optical parts.

The projection system disclosed in JP-A-2016-156986, however, has a problem of a high temperature of the interior of the optical system. In detail, when the projection system is used to project, for example, high-luminous-flux image light, the optical parts and the atmosphere therearound are likely to have high temperature. The temperature of a member that holds any of the optical parts rises, and the member thermally expands, resulting in a decrease in the positional precision of the optical part in some cases. A decrease in the positional precision is likely to degrade the display quality of a projected image or any other projected object. In particular, in a deflection-type projection system, the optical axis thereof angularly shifts at an angle twice the angle of incidence based on Snell's law, so that degradation in the display quality can be undesirably noticeable. That is, a projection optical apparatus having improved internal cooling capability as compared with that in related art has been required.

SUMMARY

A projection optical apparatus includes a first housing, a second housing accommodated in the first housing, and a projection system accommodated in the second housing. The projection system includes a first reflector deflecting an optical path of the projection system. The first housing has a plurality of first openings that cause an interior of the first housing to communicate with an exterior of the first housing. The second housing has a plurality of second openings that cause an interior of the second housing to communicate with an exterior of the second housing.

A projection optical apparatus includes a first housing, a second housing accommodated in the first housing, a projection system accommodated in the second housing, and a heat dissipater exposed to a region outside the second housing. The projection system includes a first reflector deflecting an optical path of the projection system. The first housing has a plurality of first openings that cause an interior of the first housing to communicate with an exterior of the first housing. The heat dissipater is provided at the first reflector.

A projector includes a light source apparatus, a light modulator modulating light emitted from the light source apparatus, and the projection optical apparatus described above projecting the light modulated by the light modulator.

DESCRIPTION OF EXEMPLARY EMBODIMENTS

In the following drawings, axes X, Y, and Z perpendicular to one another are drawn as required, with the direction indicated by each arrow being a positive direction and the opposite direction from the positive direction being a negative direction. In the following description, the direction +Z is called above and the direction −Z is called below in some cases.

1. First Embodiment

1.1. Configuration of Projector

In the present embodiment, a projector 1 including three liquid crystal panels that are light modulators is presented by way of example. The configuration of the projector 1 according to the present embodiment will first be described with reference to FIG. 1.

Figure 1:
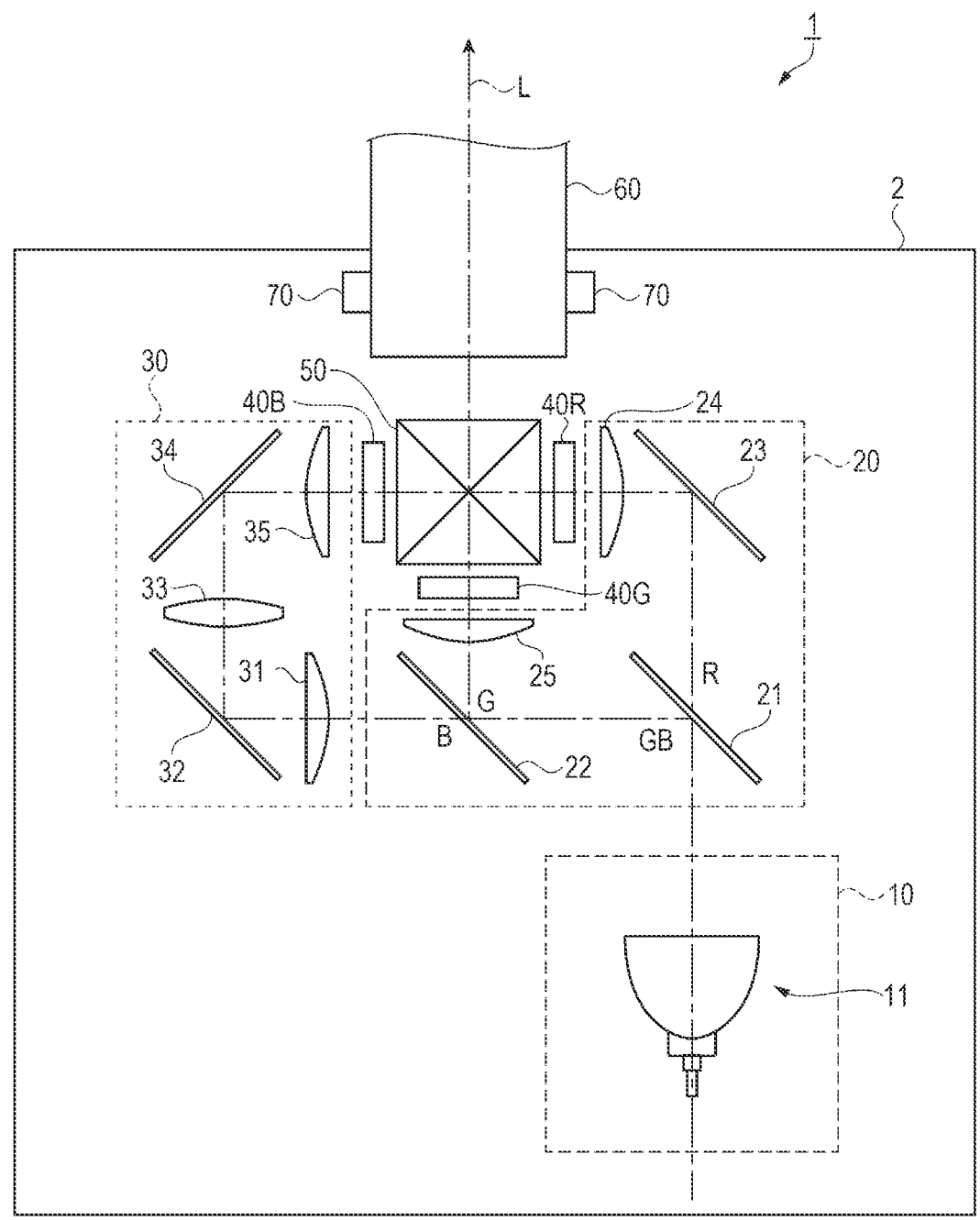
FIG. 1 is a schematic view showing the configuration of a projector according to a first embodiment.

The projector 1 includes a light source apparatus 10, a color separation system 20, a relay system 30, liquid crystal panels 40R, 40G, and 40B as the light modulators, a light combining system 50, and a projection optical apparatus 60 with the components described above accommodated in a main body 2, as shown in FIG. 1. The liquid crystal panels 40R, 40G, and 40B modulate light outputted from the light source apparatus 10. The projection optical apparatus 60 projects the light modulated by the liquid crystal panels 40R, 40G, and 40B. The projection optical apparatus 60 is an example of the projection optical apparatus according to the present disclosure.

The light source apparatus 10 includes a light source 11. The light source 11 is a discharge-type lamp and outputs light to the color separation system 20. In the light source apparatus 10, an optical integration system that is not shown but includes a fly-eye lens, a polarization converter and other components is provided between the light source 11 and the color separation system 20. The light source 11 is not limited to a discharge-type lamp and may instead be a solid-state light source, such as a light emitting diode and a laser.

The color separation system 20 includes dichroic mirrors 21 and 22, a reflection mirror 23, and field lenses 24 and 25. The light that, comes from the light source apparatus 10 and enters the color separation system 20 is separated by the dichroic mirrors 21 and 22 into three color light fluxes that belong to wavelength regions different from one another. The three color light fluxes are R light, which is substantially red light, G light, which is substantially green light, and B light, which is substantially blue light.

The dichroic mirror 21 transmits the R light and reflects the G light and the B light. The R light having passed through the dichroic mirror 21 is reflected off the reflection mirror 23, passes through the field lens 24, and illuminates the liquid crystal panel 40R for R light.

The dichroic mirror 22 transmits the B light and reflects the G light. The G light reflected off the dichroic mirror 22 passes through the field lens 25 and illuminates the liquid crystal panel 40G for G light. The B light having passed through the dichroic mirror 22 enters the relay system 30.

The relay system 30 includes a light-incident-side lens 31, reflection mirrors 32 and 34, a relay lens 33, and a light-exiting-side lens 35 as a field lens. The B light tends to have an optical path and a light flux longer and greater than those of the R light and the G light. To handle the situation described above, the relay lens 33 suppresses an increase in the diameter of the light flux. The reflection mirror 32 reflects the B light incident from the color separation system 20, and the light-incident-side lens 31 causes the 3 light to converge in the vicinity of the relay lens 33. The B light then diverges toward the reflection mirror 34 and the light-exiting-side lens 35. The B light reflected off the reflection mirror 34 passes through the light-exiting-side lens 35 and illuminates the liquid crystal panel 40B for B light.

The liquid crystal panels 40R, 40G, and 40B convert the color light fluxes incident via the light incident surfaces thereof into light fluxes having intensities according to corresponding image signals and output the converted light fluxes to the light combining system 50. The liquid crystal panels 40R, 40G, and 40B are each a transmissive liquid crystal panel.

The liquid crystal panels 40R, 40G, and 40B as the light modulators are not necessarily transmissive but may be reflective. Digital micromirror devices or the like may instead be employed as the light modulators. Further, the configuration in which a light modulator is provided for each of the plurality of color light fluxes is not necessarily employed, and a single light modulator may modulate the plurality of color light fluxes in a time division manner.

The light combining system 50 is a cross dichroic prism and combines the converted color light fluxes incident from the liquid crystal panels 40R, 40G, and 40B with one another. The three converted color light fluxes, the converted R light, G light, and B light, thus produce combined light L, which displays a color image. The combined light L exits toward the projection optical apparatus 60.

The projection optical apparatus 60 is attached to the main body 2 via a lens attachment section 70. The projection optical apparatus 60 is attachable to and detachable from the main body 2. The combined light L having entered the projection optical apparatus 60 is enlarged and displayed as image light via the projection optical apparatus 60 on a projection target that is not shown, such as a screen.

1.2. Configuration of Projection Optical Apparatus

The configuration of the projection optical apparatus 60 will be described with reference to FIGS. 2 and 3. In FIG. 3, the components excluding the projection optical apparatus 60, the light combining system 50 in the main body 2, and the lens attachment section 70 are omitted.

Figure 2:
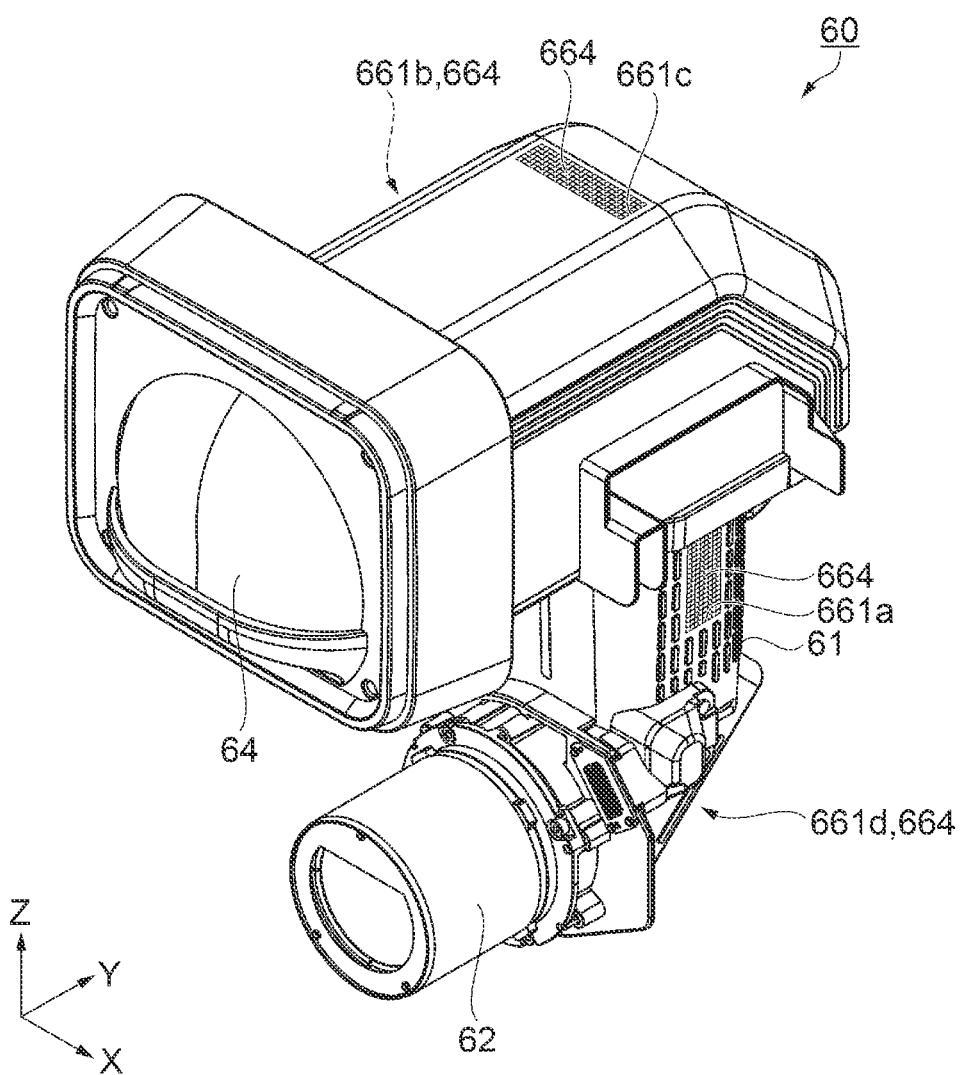
FIG. 2 is a perspective view showing the external appearance of a projection optical apparatus.
Figure 3:
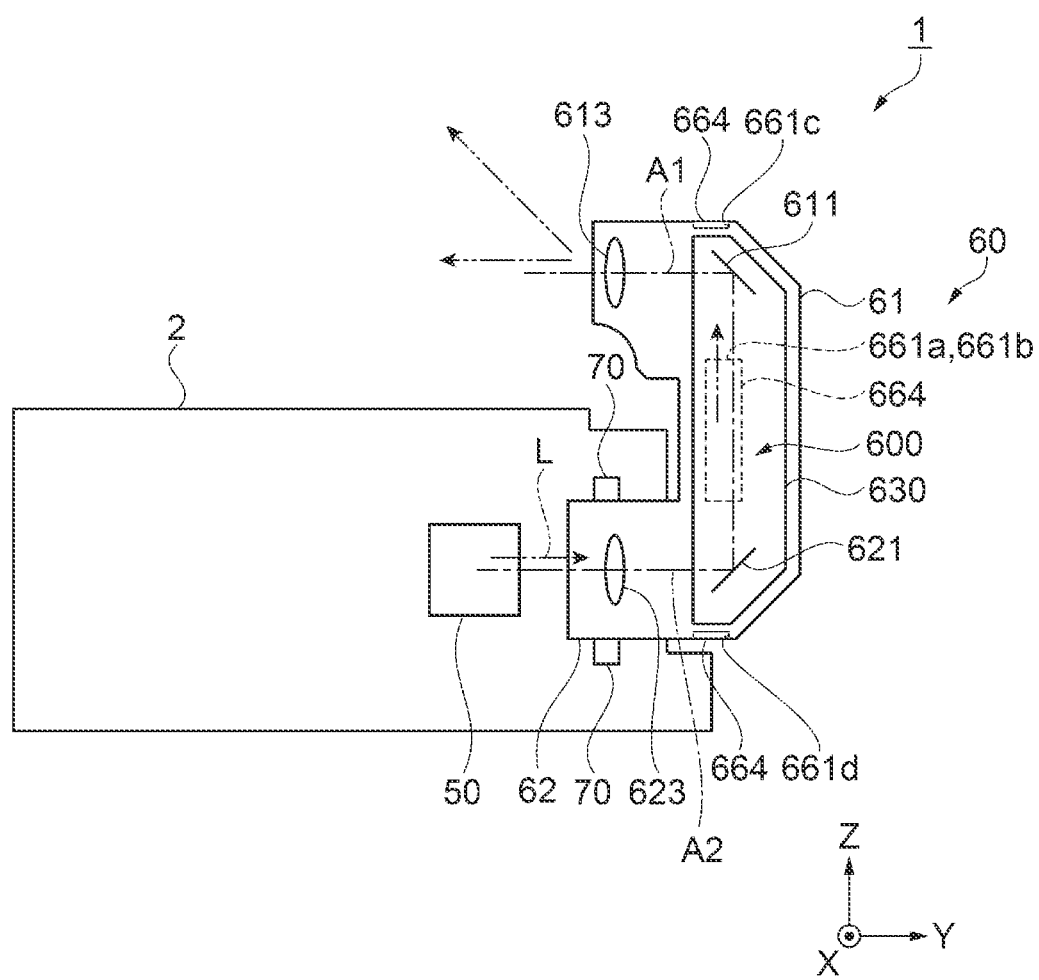
FIG. 3 is a diagrammatic view showing the configuration of the projection optical apparatus.

The projection optical apparatus 60 is a deflection-type projection lens and includes an optical system so bent as to have a substantially U-letter-like shape in the plan view viewed in the direction +X, as shown in FIG. 2. A cylindrical section 62 oriented in the direction −Y is provided at the lower end of the projection optical apparatus 60. When the projection optical apparatus 60 is attached to the main body 2, the cylindrical section 62 is inserted into the lens attachment section 70 described above.

An openable/closable lens cover 64 is provided at the upper end of the projection optical apparatus 60. FIG. 2 shows the state in which the lens cover 64 is closed. The lens cover 64 is open when the projection optical apparatus 60 is used, and the image light exits via the opening, whereas the lens cover 64 is closed when the projection optical apparatus 60 is not used to protect the interior of the projection optical apparatus 60. The lens cover 64 may be attachable to and detachable from the projection optical apparatus 60.

A lens barrel 61 is provided as a first housing between the cylindrical section 62 and the lens cover 64. The lens barrel 61 accommodates a frame as a second housing that will be described later and other components.

The lens barrel 61 is provided with a plurality of first openings 661a, 661b, 661c, and 661d, which allow the interior of the lens barrel 61 to communicate with the exterior of the lens barrel 61. In the following description, the plurality of first openings 661a, 661b, 661c, and 661d are also collectively simply referred to as first openings 661. The first openings 661 each have a substantially oblong planar shape.

Out of the first openings 661, two first openings, the first openings 661a and 661b, face each other in the direction along the axis X, which is a first direction. In detail, in the lens barrel 61, the first opening 661a is disposed in the side surface facing the positive side of the direction X, and the first opening 661b is disposed in the side surface facing the negative side of the direction X. Out of the first openings 661, another two first openings, the first openings 661c and 661d, face each other in the direction along the axis 2, which is a second direction and intersects the direction along the axis X. In detail, the first opening 661c is disposed in an upper portion of the lens barrel 61, and the first opening 661d is disposed in a lower portion of the lens barrel 61.

The present embodiment shows by way of example that the lens barrel 61 has the four first; openings 661, but not necessarily. The number of first openings 661 may be five or greater. In this case, at least two of the first openings 661 may face each other in the first direction, and at least another two of the first openings 661 may face each other in the second direction. The first and second directions are not limited to the directions along the axes X and 2, respectively. The first and second directions may, for example, be two directions that intersect each other in a plane along the plane X-Z.

The first openings 661 are each provided with a dustproof member 664. The air in the interior of the lens barrel 61 flows to the exterior of the lens barrel 61 via the dustproof members 664, and vice versa. The dustproof members 664 are, for example, each a dustproof filter formed of a molded plate-shaped fibers made of felt or paper.

The cylindrical section 62 of the projection optical apparatus 60 is inserted into the lens attachment section 70 and attached to the main body 2, as shown in FIG. 3. The combined light L having exited in the direction +Y out of the light combining system 50 enters the projection optical apparatus 60 via an end surface of the cylindrical section 62 that is the end surface facing the negative side of direction Y.

The projection optical apparatus 60 includes in the lens barrel 61 a projection system 600 and a frame 630 as the second housing, which accommodates the projection system 600. The projection optical apparatus 60 successively deflects through two steps the combined light L incident from the light combining system 50. The combined line L is therefore reversed and exits as the image light out of the projector 1 in the direction −Y.

The projection system 600 includes a first reflector 611, a second reflector 621, a first lens group 613, and a second lens group 623. The first reflector 611 and the second reflector 621 deflect the optical path of the combined light L. The first lens group 613 is disposed on a rear stage of the first reflector 611. The second reflector 621 is disposed on a front stage of the first reflector 611. The second lens group 623 is disposed on the front stage of the second reflector 621. The first reflector 611 is so disposed that; the end thereof facing the negative side of the direction Y rises by about 45 degrees with respect to the plane X-Y. The second reflector 621 is so disposed that the end thereof facing the positive side of the direction Y rises by about 45 degrees with respect to the plane X-Y.

In the present specification, the front stage is the side close to the light source apparatus 10, and the rear stage is the side far from the light source apparatus 10, that is, the side close to a projection target. Therefore, the front stage is the reduction side of the projection system 600, and the rear side is the enlargement side of the projection system 600. That is, the components that form the projection system 600 are arranged in the following order in the direction in which the combined light L travels: the second lens group 623; the second reflector 621; the first reflector 611; and the first lens group 613. FIG. 3 shows only a lens of the second lens group 623 that is the lens closest to the light combining system 50 and a lens of the first lens group 613 that is the lens closest to the projection target and does not show the other lenses.

The lens barrel 61 accommodates the frame 630, which is the second housing. The frame 630 accommodates the first reflector 611 and the second reflector 621. FIG. 3 shows the configuration in which the frame 630 accommodates the first reflector 611 and the second reflector 621 of the projection system 600, but not necessarily. The frame 630 may further accommodate the first lens group 613 and the second lens group 623. The frame 630 will be described later in detail.

The first reflector 611 and the second reflector 621 deflect the optical path of the combined light L in such a way that an optical axis A1 of the first lens group is substantially parallel to an optical axis A2 of the second lens group. In detail, the combined light L having entered the projection optical apparatus 60 travels along the optical axis A2 of the second lens group 623 and reaches the second reflector 621. The second reflector 621 reflects and deflects the combined light L in such a way that the combined light L travels in the direction substantially perpendicular to the optical axis A2 and substantially extends along the axis Z. The combined light L reflected off the second reflector 621 reaches the first reflector 611. The first reflector 611 reflects and deflects the combined light L in such a way that the combined light L travels in the direction substantially perpendicular to the axis Z and substantially extends along the axis Y. The combined light L reflected off the first reflector 611 travels along the optical axis A1 and enters the first lens group 613.

The first lens group 613 enlarges the light flux of the combined light L incident from the side facing the positive side of the direction Y and causes the combined light L to exit toward the negative side of the direction Y. The combined light L having exited out of the first lens group 613 then forms enlarged image light, which is projected via the projection optical apparatus 60 in the form of swing and tilt projection toward a region above the projector 1 and facing the negative side of the direction Y.

A third lens group may be disposed in the optical path between the first reflector 611 and the second reflector 621. The third lens group can increase or decrease the light flux width of the combined light L reflected off the second reflector 621 and directed toward the first reflector 611.

The first openings 661c and 661d face each other with the frame 630 sandwiched therebetween in the direction along the axis Z. The first openings 661a and 661b face each other with the frame 630 sandwiched therebetween in the direction along the axis X. The first openings 661 are exposed to the space outside the projector 1 with the projection optical apparatus 60 attached to the projector 1 so that the interior of the lens barrel 61 communicates with the exterior of the lens barrel 61. A plurality of second openings that will be described later and provided in the frame 630 are each provided in a position corresponding to any of the first openings 661.

The projection optical apparatus 60 shortens the focal length of the projector 1 as compared with that of a projector including a non-deflection-type projection lens. Using the deflection-type projection optical apparatus 60 allows projection in a position close to the projection target. The deflection-type projection optical apparatus 60 does not necessarily have the configuration described above and may have any configuration that can deflect the optical path of the combined light L outputted from the main body 2 and output the deflected combined light L.

1.3. Configuration of Frame

Figure 4:
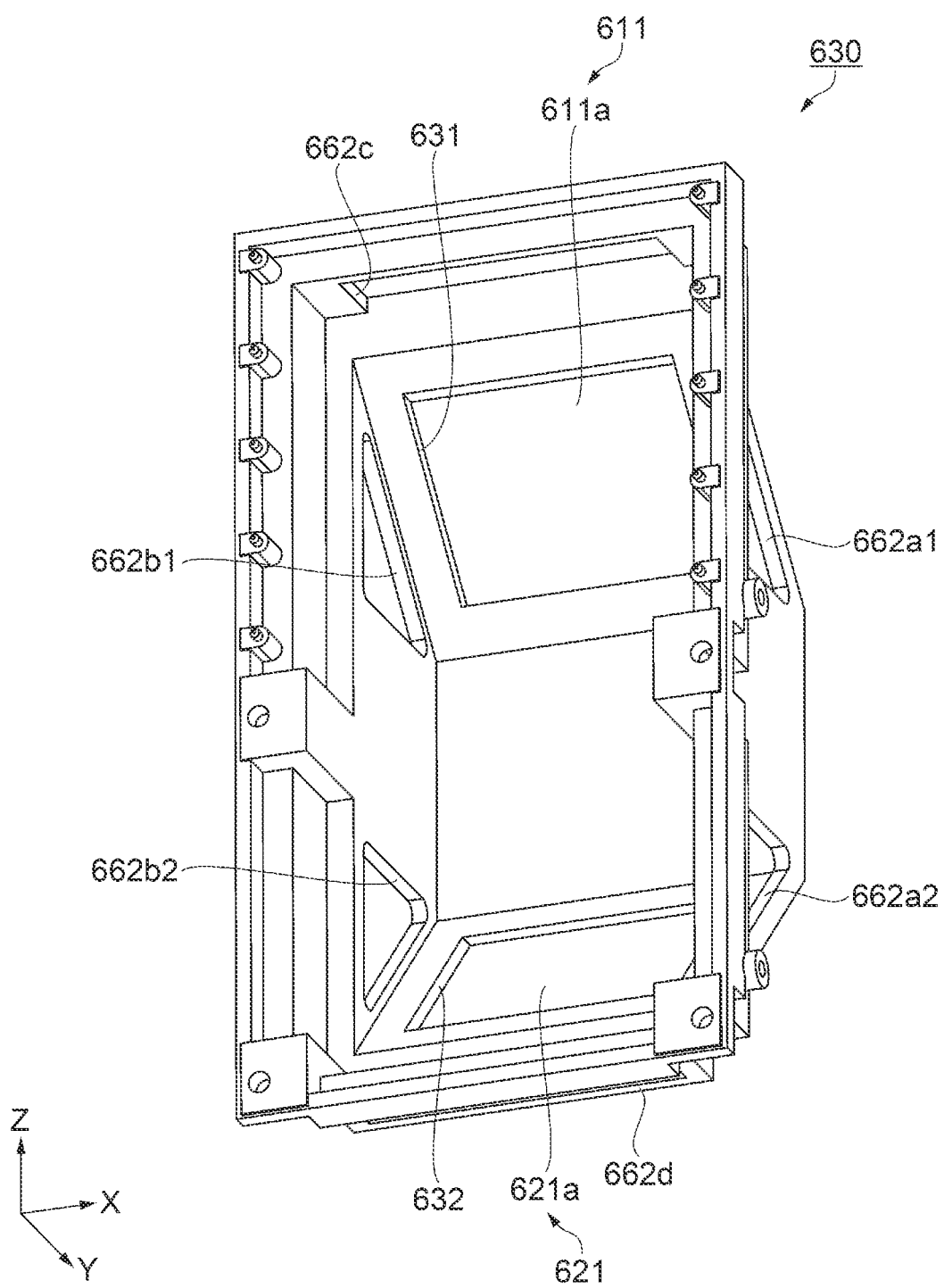
FIG. 4 is a perspective view showing the external appearance of a frame.
Figure 5:
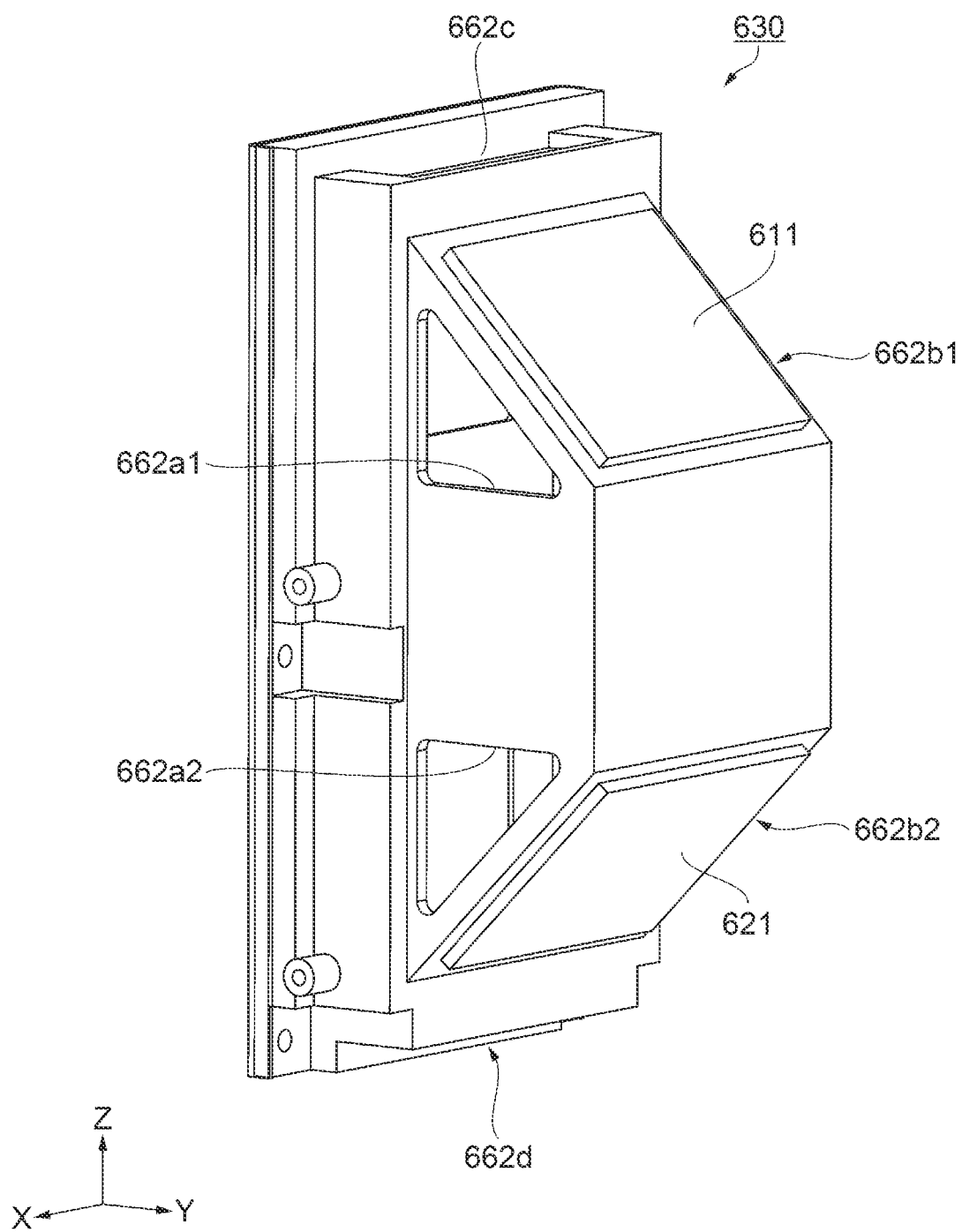
FIG. 5 is another perspective view showing the external appearance of the frame.

The configuration of the frame 630 will be described with reference to FIGS. 4 and 5. The frame 630 has a substantially trapezoidal shape in the plan view in the direction +X, and the trapezoidal shape is so configured that the bottom base facing the negative side of the direction Y is longer than the upper base facing the positive side of the direction Y, as shown in FIGS. 4 and 5. The frame 630 has a quadrangular columnar shape having a bottom surface having the trapezoidal shape described above, and the direction along the axis X coincides with the height direction of the quadrangular column. A region of the frame 630 that is the region corresponding to the bottom base described above has a rectangular-frame-like shape in the plan view in the direction −Y.

The frame 630 has a substantially quadrangular columnar shape as described above and has a surface open toward the negative side of the direction Y. The frame 630 has a first window 631 and a second window 632. In the portions corresponding to the legs of the trapezoidal shape described above, the upper surface is provided with the first window 631, and the lower surface is provided with the second window 632. The first reflector 611 is disposed in the first window 631, and the second reflector 621 is disposed in the second window 632. The first reflector 611 and the second reflector 621 are fixed to the frame 630, for example, via bonding. The bonding is achieved, for example, by a UV-curing adhesive.

A first reflection surface 611a of the first reflector 611 is exposed via the first window 631 to a side of the frame 630 that is the side facing the negative side of the direction Y, that is, the inner side of the frame 630. A second reflection surface 621a of the second reflector 621 is exposed via the second window 632 to the inner side of the frame 630 described above. The first reflection surface 611a and the second reflection surface 621a form the optical path of the combined light L described above in the internal space of the frame 630.

Specifically, the combined light L passes through the second lens group 623 described above and reaches the second reflector 621 via the second window 632. The combined light L is then reflected off the second reflector 621 in the direction +Z and reaches the first reflector 611 via the first window 631. The combined light L reflected off the first reflector 611 travels in the direction −Y via the first window 631 and enters the first lens group 613 described above.

The frame 630 is provided with a plurality of second openings 662a1, 662a2, 662b1, 662b2, 662c, and 662a, which cause the interior of the frame 630 to communicate with the exterior of the frame 630, that is, the inner side of the frame 630 to communicate with the outer: side of the frame 630. The second openings 662a1, 662a2, 662b1, and 662b2 are each a substantially triangular communication hole in the plan view. The second openings 662c and 662d are each a substantially oblong communication hole in the plan view. In the following description, the plurality of second openings 662a1, 662a2, 662b1, 662b2, 662c, and 662d are also collectively referred to as the second openings 662.

The second openings 662a1 and 662a2 are provided in a bottom surface of the quadrangular column described above that is the bottom surface facing the positive side of the direction X, that is, a side surface of the quadrangular column that is the side surface facing the positive side of the direction X, and the second openings 662a1 and 662a2 are arranged in this order in the downward direction. The second openings 662b1 and 662b2 are provided in a bottom surface of the quadrangular column described above that is the bottom surface facing the negative side of the direction X, that is, a side surface of the quadrangular column that is the side surface facing the negative side of the direction X, and the second openings 662b1 and 662b2 are arranged in this order in the downward direction. The second openings 662a1 and 662b1 face each other in the direction along the axis X, and so does the second openings 662a2 and 662b2.

The second opening 662c is provided in the frame-shaped region described above in an upper portion of the frame 630. The second opening 662d is provided in the frame-shaped region described above in a lower portion of the frame 630. The second openings 662c and 662d face each other in the direction along the axis Z.

The second openings 662 may each be provided with a dustproof member similar to the dustproof members 664 in the first openings 661. The dustproof members further reduce dust contained in the air taken from the outer space, whereby adhesion of dust to optical parts, such as the first reflector 611 and the second reflector 621, is suppressed.

In the present embodiment, the form including the six second openings 662 has been presented by way of example, but the shape, number, or arrangement of the second openings 662 are not limited to a specific shape, number or arrangement.

Examples of the material of the frame 630 may include acrylonitrile-butadiene-styrene copolymer resin, polycarbonate resin, polyacetal resin, polyphenylene ether resin, polybutylene terephthalate resin, polysulphone resin, polyether ether ketone resin, fluororesin, liquid crystal polymer and other aromatic polyester resins, and polyphenylene sulfide resin and other resins. The frame 630 may contain fillers, such as glass fibers, or an additive as well as any of the resins described above.

1.4. Configuration of Air Channel

An air channel in the projection optical apparatus 60 will be described with reference to FIGS. 6 to 8. The air channel used herein uses an air flow produced by what is called a chimney effect to cool heat generated in the optical parts and other components when the projection optical apparatus 60 is used. The air channel changes in accordance with the attitude of the installed projection optical apparatus 60. Air channels according to three installation attitudes will therefore be presented by way of example.

1.4.1. Flat Installation

When the projector 1 to which the projection optical apparatus 60 is attached is installed in a flat attitude, the direction from the second opening 662c toward the second opening 662d, that is, the direction −Z substantially coincides with the vertical direction (the gravity direction). In this case, buoyancy produced by hot air based on a chimney effect acts in the direction +Z, which is opposite from the vertical direction.

Figure 6:
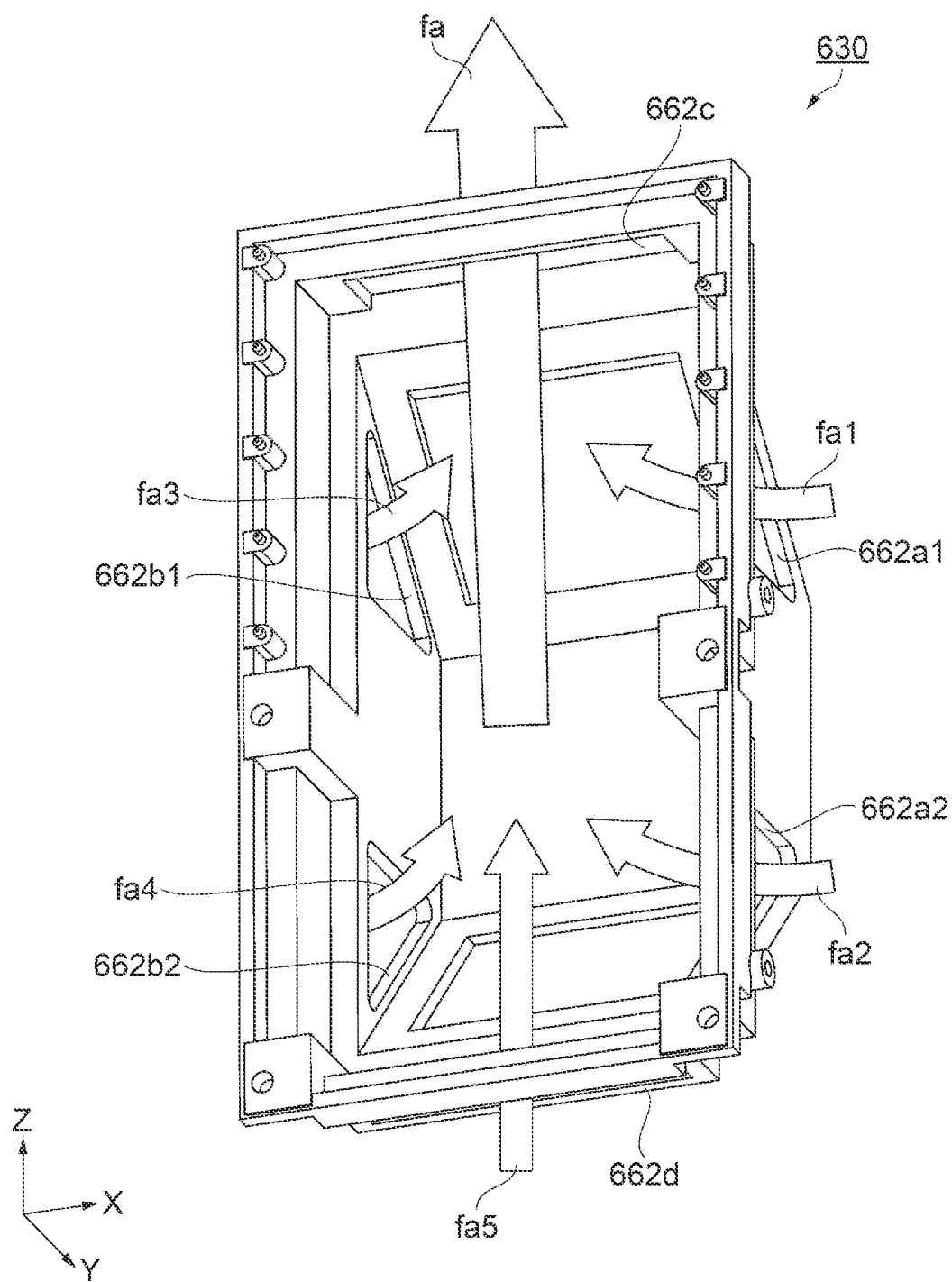
FIG. 6 is a diagrammatic view showing the configuration of an air channel.

When the optical parts are heated, the air around the optical parts is heated to form an air flow fa in the frame 630, as shown in FIG. 6. The flow fa travels upward and exits out of the frame 630 via the second opening 662c. The flow fa then flows out of the projection optical apparatus 60 via the first opening 661c in the upper portion of the lens barrel 61 described above. In this process, the air outside the frame 630 flows in correspondence with the flow fa into the frame 630 via the second openings 662 excluding the second opening 662c.

In detail, the following flows are produced: a flow fa1 passing through the second opening 662a1; a flow fa2 passing through the second opening 662a2; a flow fa3 passing through the second opening 662b1; a flow fa4 passing through the second opening 662b2; and a flow fa5 passing through the second opening 662d. The flows fa1 and fa2 are each a relatively cool air flow that flows into the frame 630 from the space outside the projection optical apparatus 60 via the first opening 661a of the lens barrel 61 described above. Similarly, the flows fa3 and fa4 are each an air flow that flows into the frame 630 via the first opening 661b of the lens barrel 61. The flow fa5 is an air flow that flows into the frame 630 via the first opening 661d of the lens barrel 61.

When heated by the heat of the optical parts, the flows fa1 to fa5 form the flow fa, which flows out of the projection optical apparatus 60. The flow fa is successively produced until the optical parts are cooled and dissipates the heat of the optical parts out of the projection optical apparatus 60. The optical parts, such as the first reflector 611, and the frame 630 are thus cooled.

1.4.2. Ceiling Suspension Installation

When the projector 1 to which the projection optical apparatus 60 is attached is suspended, for example, from a ceiling, the direction from the second opening 662*d* toward the second opening 662*c*, that is, the direction +Z substantially coincides with the vertical direction. In this case, buoyancy produced by hot air based on the chimney effect acts in the direction −Z, which is opposite from the vertical direction.

Figure 7:
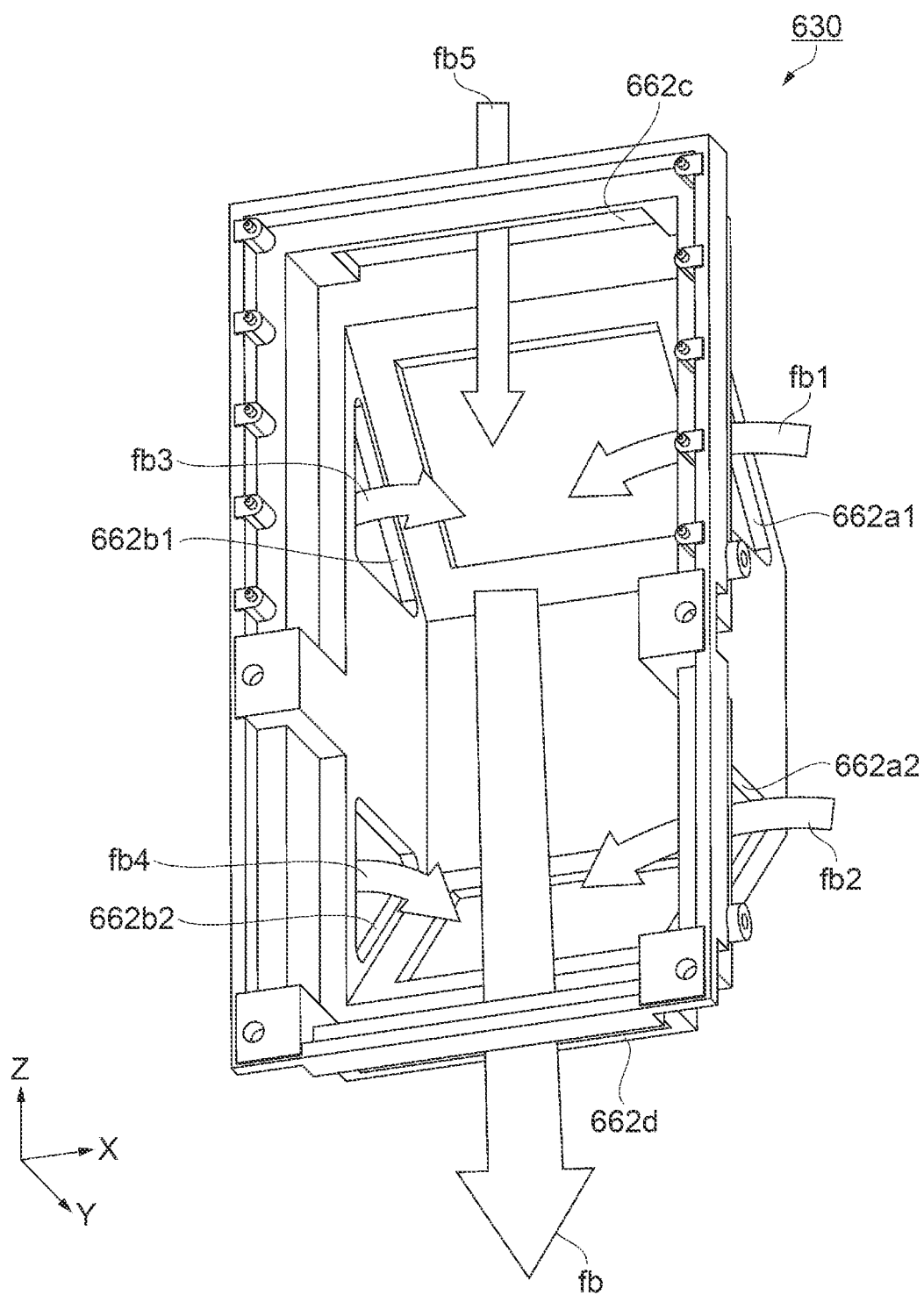
FIG. 7 is a diagrammatic view showing the configuration of another air channel.

When the optical parts are heated, the air around the optical parts is heated to form an air flow fb, as shown in FIG. 7. The flow fb travels in the direction −Z and exits out of the frame 630 via the second opening 662*d*. The flow fb exits out of the projection opening apparatus 60 via the first opening 661*d* in the lower portion of the lens barrel 61 described above. In this process, the air outside the frame 630 flows in correspondence with the flow fb into the frame 630 via the second openings 662 excluding the second opening 662*d*.

In detail, the following flows are produced: a flow fb1 passing through the second opening 662*a*1; a flow fb2 passing through the second opening 662*a*2; a flow fb3 passing through the second opening 662*b*1; a flow fb4 passing through the second opening 662*b*2; and a flow fb5 passing through the second opening 662*c*. The flows fb1 and fb2 are each a relatively cool air flow that flows into the frame 630 from the space outside the projection optical apparatus 60 via the first opening 661*a* of the lens barrel 61 described above. Similarly, the flows fb3 and fb4 are each an air flow that flows into the frame 630 via the first opening 661*b* of the lens barrel 61. The flow fb5 is an air flow that flows into the frame 630 via the first opening 661*c* of the lens barrel 61.

When heated by the heat of the optical parts, the flows fb1 to fb5 form the flow fb, which flows out of the projection optical apparatus 60. The flow fb is successively produced until the optical parts are cooled and dissipates the heat of the optical parts out of the projection optical apparatus 60. The optical parts, such as the first reflector 611, and the frame 630 are thus cooled.

1.4.3. Vertical Installation

Vertical installation of the projector 1 to which the projection optical apparatus 60 is attached will be described in association with a case where the projection optical apparatus 60 is so installed that the side thereof facing the negative side of the direction X is the lower side. In this case, the direction −X substantially coincides with the vertical direction, and buoyancy produced by hot air based on the chimney effect acts in the direction +X, which is opposite from the vertical direction.

Figure 8:
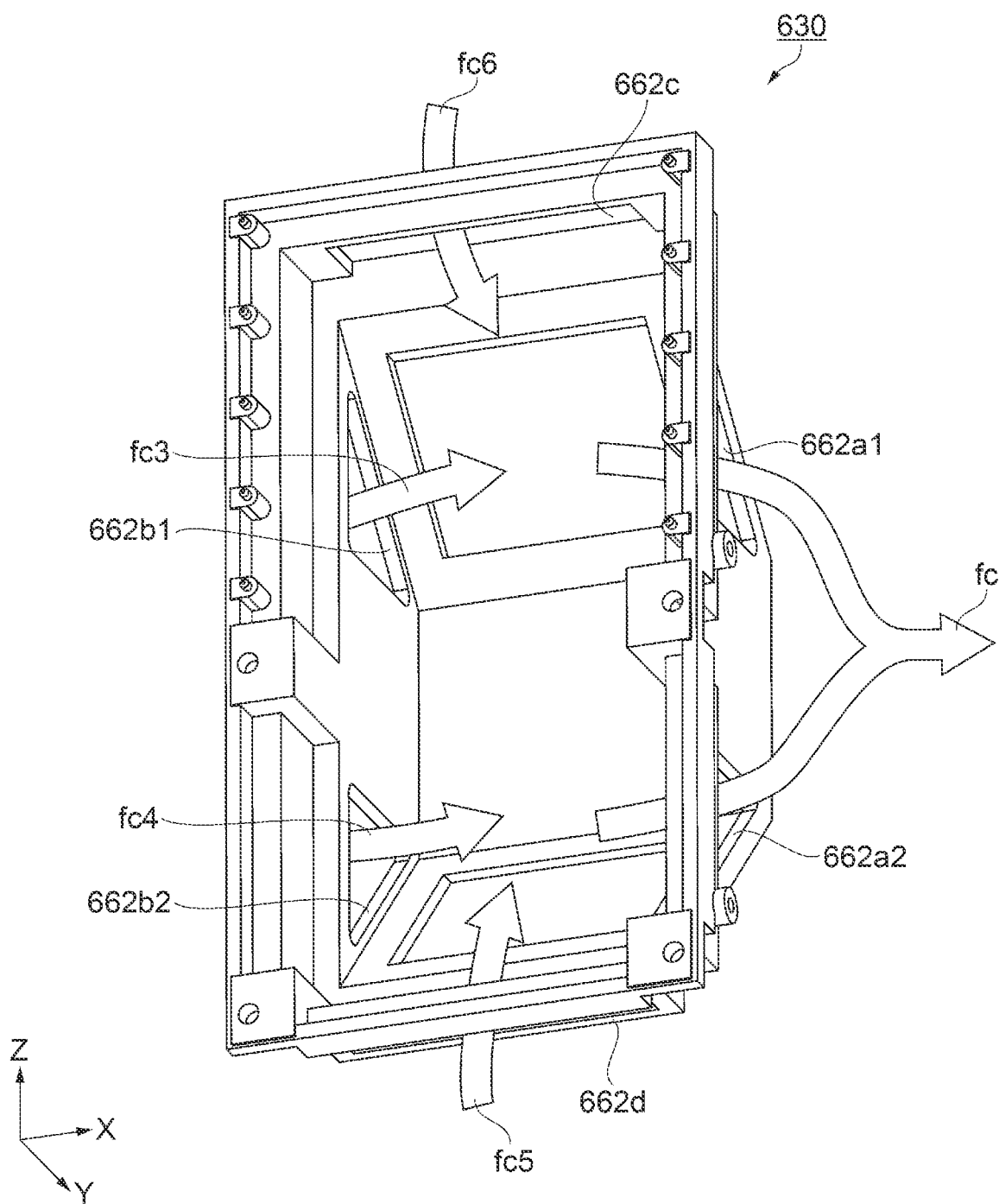
FIG. 8 is a diagrammatic view showing the configuration of another air channel.

When the optical parts are heated, the air around the optical parts is heated to form an air flow fc, as shown in FIG. 8. The flow fc travels in the direction +X and exits out of the frame 630 via the second openings 662*a*1 and 662*a*2. The flow fc exits out of the projection opening apparatus 60 via the first opening 661*a* in a side portion of the lens barrel 61 described above. In this process, the air outside the frame 630 flows in correspondence with the flow fc into the frame 630 via the second openings 662 excluding the second openings 662*a*1 and 662*a*2.

In detail, the following flows are produced: a flow fc3 passing through the second opening 662*b*1; a flow fc4 passing through the second opening 662*b*2; a flow fc5 passing through the second opening 662*d*; and a flow fc6 passing through the second opening 662*c*. The flows fc3 and fc4 are each a relatively cool air flow that flows into the frame 630 from the space outside the projection optical apparatus 60 via the first opening 661*b* of the lens barrel 61 described above. Similarly, the flow fc5 is an air flow that flows into the frame 630 via the first opening 661*d* of the lens barrel 61. The flow fc6 is an air flow that flows into the frame 630 via the first opening 661*c* of the lens barrel 61.

When heated by the heat of the optical parts, the flows fc3 to fc6 form the flow fc, which flows out of the projection optical apparatus 60. The flow fc is successively produced until the optical parts are cooled and dissipates the heat of the optical parts out of the projection optical apparatus 60. The optical parts, such as the first reflector 611, and the frame 630 are thus cooled.

When the projection optical apparatus 60 is so installed that the side thereof facing the positive side of the direction X is the lower side, the optical parts and the frame 630 are similarly cooled except that the air flows passing through the second openings 662*a*1, 662*a*2, 662*b*1, and 662*b*2 are reversed.

When the third lens group described above is provided in the frame 630, the third lens group is so disposed that the air flow fa, fb, or fc or any other air flow is not blocked. Specifically, for example, a member that supports the third lens group may be provided, for example, with a through hole that forms a channel.

As described above, air flows are formed in the first openings 661 of the lens barrel 61, the second openings 662 of the frame 630, and the frame 630 in accordance with the attitude of the installed projector 1.

The present embodiment can provide the effects below.

The internal cooling capability of the projection optical apparatus 60 can be improved as compared with that in related art. In detail, the air having flowed into the interior of the lens barrel 61 via any of the first openings 661 flows into the interior of the frame 630 via any of the second openings 662. The air having flowed into the interior of the frame 630 cools the projection system 600, such as the first reflector 611, and exits out of the frame 630 via the other second openings 662. The air discharged out of the frame 630 is discharged out of the lens barrel 61 via the other first openings 661. The air flow fa, fb, or fc or any other air flow dissipates the heat of the projection system 600 out of the projection optical apparatus 60 to cool the interior of the lens barrel 61. A projection optical apparatus 60 having improved cooling capability can therefore be provided. Further, a projector 1 having improved optical precision and improved display quality of a projected image and any other object can be provided.

When the projection optical apparatus 60 is used in the projector 1, the direction in which the projection optical apparatus 60 projects an image or any other object is deflected by about 180° in the plan view in which the projection optical apparatus 60 is viewed in the direction +X. The projector 1 can therefore be installed with improved flexibility.

The heat generated in the interior of the projection optical apparatus 60 heats the air around the interior to produce buoyance. The heated air that produces buoyance is discharged via one of the plurality of first openings 661 that is closest to the opposite side from the side to which the vertical direction is oriented. In this process, low-temperature air is sucked into the interior of the projection optical apparatus 60 via the other first openings 661. What is called a chimney effect described above allows further improvement of the internal cooling capability.

Since the first openings are each provided with the dustproof member 664, the dustproof members 664 remove dust from the air sucked into the lens barrel 61. Adhesion of dust to the optical parts of the projection system 600 is thus suppressed. The cleanliness of the optical parts, such as the first reflector 611, is thus maintained, whereby the display quality of a projected image or any other projected object can be maintained when the projection optical apparatus 60 is used in the projector 1.

Since the frame 630 is made of resin, the weight of the frame 630 is reduced as compared with a case where the frame 630 is made of metal. Further, the frame 630 can be readily formed in a simple method, for example, in injection molding, whereby the processing cost and other related costs can be reduced, and the material cost can also be reduced. The manufacturing cost and weight of the projection optical apparatus 60 can thus be reduced.

2. Second Embodiment

In the present embodiment, a projection optical apparatus that is a deflection-type projection lens that can be used in the projector 1 is presented by way of example, as in the first embodiment. The projection optical apparatus according to the present embodiment differs from the projection optical apparatus 60 according to the first embodiment in terms of the configuration of the frame.

The projection optical apparatus according to the present embodiment includes the lens barrel 61 as the first housing, a frame 930 as the second housing accommodated in the lens barrel 61, and the projection system 600 accommodated in the frame 930, as the projection optical apparatus 60 according to the first embodiment does. The projection system 600 includes the first reflector 611, which deflects the optical path of the projection system 600. The lens barrel 61 is provided with the first openings 661a, 661b, 661c, and 661d, which allow the interior of the lens barrel 61 to communicate with the exterior of the lens barrel 61.

Figure 9:
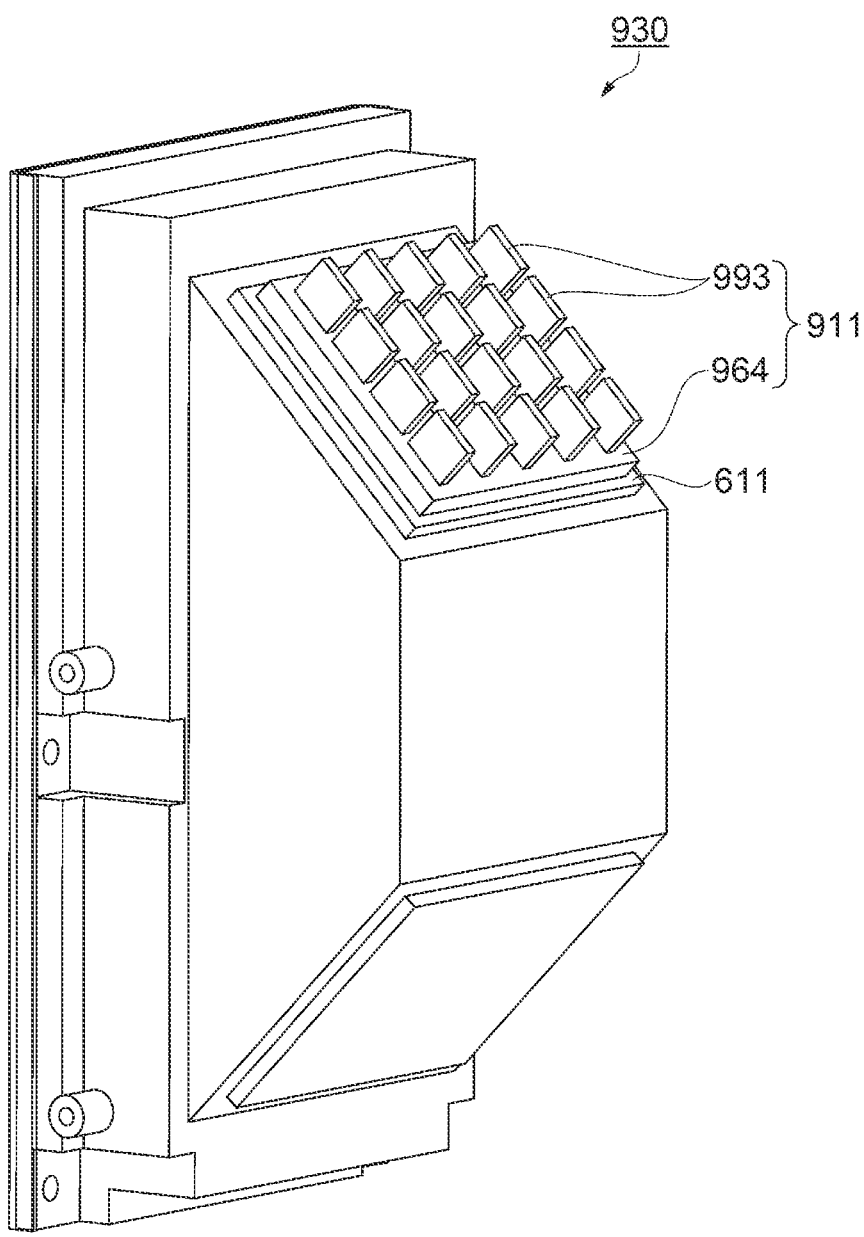
FIG. 9 is a perspective view showing the arrangement of a heat dissipater of the projection optical apparatus according to a second embodiment.

The configuration of the frame 930 will be described below with reference to FIG. 9. The frame 930 has a quadrangular columnar shape substantially similar to the shape of the frame 630 in the first embodiment but differs from the frame 630 in that the second openings 662 in the frame 630 are not provided and the first reflector 611 is provided with a heat dissipater 911, as shown in FIG. 9. Therefore, the same constituent portions as those in the first embodiment have the same reference characters, and no redundant description of the same constituent portions will be made.

The heat dissipater 911 includes a base 964 and protrusions 993. The base 964 is a substantially rectangular flat plate similar to the first reflector 611. One of the principal surfaces of the base 964 is in contact with and attached to the outer surface of the first reflector 611, in other words, a surface of the first reflector 611 that is the surface opposite from the first reflection surface that is not shown. The other principal surface of the base 964 is provided with the protrusions 993. The protrusions 993 are formed of a plurality of heat dissipation fins that protrude in the direction of a normal to the other principal surface of the base 964 and are arranged in a matrix in the plan view of the principal surface. The heat dissipater 911 is therefore exposed to the space outside the frame 930 and inside the lens barrel 61, which is not shown. The space outside the frame 930 refers to the space facing the side to which the base 964 is attached.

The material of the heat dissipater 911 is, for example, metal having relatively high thermal conductivity, such as copper and aluminum.

When the projection optical apparatus according to the present embodiment is used in the projector 1, the heat of the first reflector 611 heated by the combined light L described above propagates to the heat dissipater 911. The heat having propagated to the heat dissipater 911 is dissipated from the protrusions 993 via the base 964 and heats the air around the heat dissipater 911. The heated air, which produces buoyance acting on the opposite side from the side to which the vertical direction is oriented, flows out of the lens barrel 61 via any of the first openings 661 that are not shown in accordance with the attitude of the installed projector 1. In this process, the air outside the lens barrel 61 flows into the space between the lens barrel 61 and the frame 930 via the other first openings 661. The air flow is successively produced until the first reflector 611 is cooled and dissipates the heat of the first reflector 611 out of the lens barrel 61. The first reflector 611 and other components are thus cooled.

The number, shape, and arrangement of the protrusions 993 of the heat dissipater 911 are not limited to the number, shape, and arrangement described above. The frame 930 may be provided with communication holes, such as the second openings 662 in the first embodiment, to cool the optical parts in the frame 930.

The present embodiment can provide the effects below.

The internal cooling capability of the projection optical apparatus can be improved as compared with that in related art. In detail, the air having flowed into the lens barrel 61 via any of the first openings 661 cools the heat dissipater 911 and is discharged out of the lens barrel 61 via the other first openings 661. The air flow therefore dissipates the heat of the first reflector 611 out of the lens barrel 61 to cool the interior thereof. A projection optical apparatus having improved cooling capability can therefore be provided.

What is claimed is:

1. A projection optical apparatus comprising:
    a first housing;
    a second housing accommodated in the first housing; and
    a projection system accommodated in the second housing,
        wherein the projection system includes a second reflector that has a second reflection surface that reflects light and a first reflector that has a first reflection surface that reflects the light reflected from the second reflector,
    the first housing has a plurality of first openings that cause an interior of the first housing to communicate with an exterior of the first housing,
    the second housing has a plurality of second openings that cause an interior of the second housing to communicate with an exterior of the second housing, and
    the plurality of second openings includes an opening provided on a wall on a side of the second reflector with respect to the first reflector and an opening provided on a wall on an opposite side of the second reflector with respect to the first reflector.

2. The projection optical apparatus according to claim 1, wherein at least one of the plurality of second openings faces at least one of the plurality of first openings.

3. The projection optical apparatus according to claim 1, wherein the second housing causes heat of the projection system to be dissipated via one second opening of the plurality of second openings, the one second opening being disposed at an opposite direction to a gravity direction, and further causes air outside the second housing to be sucked via another second opening of the plurality of second openings.

4. The projection optical apparatus according to claim 1, further comprising
a heat dissipater provided at the first reflector and exposed to a region outside the second housing.

5. The projection optical apparatus according to claim 1, wherein the projection system includes
a first lens group disposed at an enlargement side of the first reflector,
a second reflector disposed at a reduction side of the first reflector, and
a second lens group disposed at the reduction side of the second reflector, and
the first reflector and the second reflector deflect the optical path of the projection system in such a way that a first optical axis of the first lens group is substantially parallel to a second optical axis of the second lens group.

6. The projection optical apparatus according to claim 1, wherein two of the plurality of first openings face each other in a first direction, and
another two of the plurality of first openings face each other in a second direction intersecting the first direction.

7. The projection optical apparatus according to claim 1, further comprising
a plurality of dustproof members provided in the plurality of respective first openings, and
air inside and outside the first housing flows through via the plurality of dustproof members.

8. The projection optical apparatus according to claim 1, wherein the second housing is made of resin.

9. A projector comprising:
a light source apparatus;
a light modulator modulating light emitted from the light source apparatus; and
the projection optical apparatus according to claim 1 projecting the light modulated by the light modulator.

10. The projection optical apparatus according to claim 6, wherein two of the plurality of second openings face each other in the first direction, and
another two of the plurality of second openings face each other in the second direction.

11. A projector comprising:
a light source apparatus;
a light modulator modulating light emitted from the light source apparatus;
a projector body housing the light source apparatus and the light modulator; and
the projection optical apparatus inserted into the projector body,
wherein the projection optical apparatus includes
a first housing,
a second housing accommodated in the first housing, and
a projection system accommodated in the second housing, and
the projection system includes a first reflector deflecting an optical path of the projection system,
the first housing has a plurality of first openings that cause an interior of the first housing to communicate with an exterior of the first housing, and
the second housing has a plurality of second openings that cause an interior of the second housing to communicate with an exterior of the second housing.

12. The projector according to claim 11,
wherein the projection system includes a second reflector that has a second reflection surface that reflects light, and
the plurality of second openings includes an opening provided on a wall on the side of the second reflector with respect to the first reflector and an opening provided on a wall on an opposite side of the second reflector with respect to the first reflector.

13. A projection optical apparatus comprising:
a first housing;
a second housing accommodated in the first housing; and
a projection system accommodated in the second housing, wherein
the projection system includes a first reflector defecting an optical path of the projection system,
the first housing has a plurality of first openings that cause an interior of the first housing to communicate with an exterior of the first housing, and
the second housing has a plurality of second openings that cause an interior of the second housing to communicate with an exterior of the second housing wherein
the projection system includes a first lens group disposed at an enlargement side of the first reflector, a second reflector disposed at a reduction side of the first reflector, and a second lens group disposed at the reduction side of the second reflector, and the first reflector and the second reflector deflect the optical path of the projection system in such a way that a first optical axis of the first lens group is substantially parallel to a second optical axis of the second lens group.

* * * * *